United States Patent
Chen

(10) Patent No.: US 11,800,494 B2
(45) Date of Patent: Oct. 24, 2023

(54) STATE DETECTION METHOD AND CONFIGURATION METHOD FOR NETWORK COMMUNICATION, TERMINAL, AND NETWORK DEVICE

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/152,257

(22) Filed: Jan. 19, 2021

(65) Prior Publication Data
US 2021/0144690 A1 May 13, 2021

Related U.S. Application Data

(63) Continuation of application No. PCT/CN2019/094541, filed on Jul. 3, 2019.

(30) Foreign Application Priority Data

Jul. 18, 2018 (CN) .......................... 201810792236.1

(51) Int. Cl.
*H04W 72/04* (2023.01)
*H04W 72/044* (2023.01)
(Continued)

(52) U.S. Cl.
CPC ......... *H04W 72/044* (2013.01); *H04L 5/0048* (2013.01); *H04L 5/0092* (2013.01); *H04W 72/542* (2023.01)

(58) Field of Classification Search
CPC ............. H04W 72/042; H04W 72/044; H04W 72/0453; H04W 72/046; H04W 72/085;
(Continued)

(56) References Cited

U.S. PATENT DOCUMENTS

2017/0093544 A1* 3/2017 Kazmi ................. H04W 24/10
2019/0191441 A1 6/2019 Kusashima
(Continued)

FOREIGN PATENT DOCUMENTS

CN 103945408 A 7/2014
CN 106879010 A 6/2017
(Continued)

OTHER PUBLICATIONS

ZTE, et al.; "Consideration on Beam Failure Detection During BWP Switch"; 3GPP TSG-RAN WG2 Meeting #101bis; Sanya, China, Apr. 16-20, 2018; R2-1804874.
Huawei et al.; "Reset of BFR timers and counters with RLM reconfiguration": 3GPP TSG-RAN WG2 Meeting 102, Busan, South Korea, May 21-25, 2018, R2-1808416.
(Continued)

*Primary Examiner* — Siu M Lee
(74) *Attorney, Agent, or Firm* — von Briesen & Roper, s.c.

(57) ABSTRACT

This disclosure relates to the field of communications technologies, and provides a state detection method and a configuration method for network communication, a terminal, and a network device. The state detection method for network communication, applied to a terminal, includes: obtaining a monitoring configuration parameter of a reference state, where the monitoring configuration parameter includes at least one set of reference state configuration parameters; and performing, based on the monitoring configuration parameter, a detection process corresponding to the reference state, where the reference state includes radio link monitor RLM and/or beam failure detection BFD.

18 Claims, 3 Drawing Sheets

(51) Int. Cl.
*H04L 5/00* (2006.01)
*H04W 72/542* (2023.01)

(58) Field of Classification Search
CPC ...... H04W 24/08; H04L 5/001; H04L 5/0048; H04L 5/0053; H04L 5/0092; H04L 5/0094; H04L 5/0098
See application file for complete search history.

(56) References Cited

U.S. PATENT DOCUMENTS

| | | | |
|---|---|---|---|
| 2019/0200248 A1* | 6/2019 | Basu Mallick | H04B 7/0695 |
| 2019/0393989 A1* | 12/2019 | Jung | H04L 1/08 |
| 2020/0059397 A1* | 2/2020 | da Silva | H04L 43/16 |
| 2020/0059404 A1 | 2/2020 | Liu et al. | |
| 2021/0058797 A1* | 2/2021 | Yoshioka | H04W 48/16 |
| 2021/0099216 A1* | 4/2021 | Takeda | H04B 7/088 |
| 2021/0153245 A1* | 5/2021 | Tooher | H04W 74/008 |

FOREIGN PATENT DOCUMENTS

| | | |
|---|---|---|
| CN | 107547619 A | 1/2018 |
| CN | 110121187 A | 8/2019 |
| CN | 110392380 A | 10/2019 |
| EP | 2466944 A1 | 6/2012 |
| JP | 2018026662 A | 2/2018 |
| JP | 2020500472 A | 1/2020 |
| WO | 2015042100 A1 | 3/2015 |
| WO | 2018082521 A1 | 5/2018 |

OTHER PUBLICATIONS

Extended European Search Report related to Application No. 19837722.8 reported on Aug. 18, 2021.
ZTE Corporation, et al.; "Clarification the SSB based BM, BFD and RLM with the operation of BWPs"; 3GPP TSG-RAN WG2 Meeting #101bis; Sanya, China, Apr. 16-20, 2018, R2-1804373.
International Search Report & Written Opinion related to Application No. PCT/CN2019/094541; reported on Jan. 28, 2021.
First Chinese Office Action for related Application No. 201810792236.1; reported on Jun. 2, 2020.
Second Chinese Office Action for related Application No. 201810792236.1; reported on Jan. 5, 2021.
Huawei, Hisilicon, "Remaining details on NR RLM", May 21-25, 2018, 3GPP TSG WG1 Meeting #93, Busan, South Korea.
Samsung, "[RIL 8034] RLM signalling for BWP". Feb. 26-Mar. 2, 2018, 3GPP TSG-RAN2#101, Athens, Greece.
Ericsson, "BWP impact to RLM configuration (E396)", Feb. 26-Mar. 2, 2018, 3GPP TSG-RAN W2 #101, Athens, Greece.
Chinese Office Action related to Application No. 201810792236.1 reported on Jan. 4, 2022.
Japanese Office Action related to Application No. 2021-502789 reported on Feb. 25, 2022.
R2-1708737—Source: InterDigital Inc. "RLM/RLF for NR", Agenda item 10.2.9, Document for: Discussion, Decision, 3GPP TSG-RAN WG2 Meeting #99 Berlin, Germany, Aug. 21-25, 2017.
R24806904—Source: ASUSTeK "On the validity of BFD counting for BFR procedure", Agenda Item: 10.3.1.4.2, Document for: Discussion and Decision, 3GPP TSG-RAN WG2 Meeting #102 Busan, Korea, May 21-25, 2018.

* cited by examiner

STATE DETECTION METHOD AND CONFIGURATION METHOD FOR NETWORK COMMUNICATION, TERMINAL, AND NETWORK DEVICE

CROSS-REFERENCE TO RELATED APPLICATIONS

The present application is a continuation application of International Application No. PCT/CN2019/094541 filed on Jul. 3, 2019, which claims priority of Chinese Patent Application No. 201810792236.1, filed in China on Jul. 18, 2018, both of which are incorporated herein by reference in their entireties.

TECHNICAL FIELD

This disclosure relates to the field of communications technologies, and in particular, to a state detection method and a configuration method for network communication, a terminal, and a network device.

BACKGROUND

In a radio link monitor (radio link monitor, RLM) function of long term evolution (Long Term Evolution, LTE), user equipment (User Equipment, UE) monitors a radio link by measuring a signal to interference plus noise ratio (Signal to Interference plus Noise Ratio, SINR) of some cell reference signals (Cell Reference Signal, CRS) over a physical downlink control channel (Physical Downlink Control Channel, PDCCH). When the measured SINR of the some CRSs over the PDCCH is lower than a specific threshold, the radio link is considered "out-of-sync" (out-of-sync, OOS). In this case, a physical layer notifies a higher layer (a radio resource control (Radio Resource Control, RRC) layer) of an out-of-sync (OOS) indication. If the RRC layer receives N out-of-sync indications consecutively, the UE starts a Timer T1.

When the measured SINR of the some CRSs over the PDCCH is higher than a specific threshold, the radio link is considered "in-sync" (in-sync, IS). In this case, a physical layer notifies a higher layer (an RRC layer) of an in-sync (IS) indication. If the RRC layer receives M in-sync indications consecutively, the UE stops running of a Timer T1.

If the timer T1 expires, the UE determines a radio link failure (Radio Link Failure, RLF).

Quantities of "out-of-sync" and "in-sync" indications are configured by a network, and are N and M, respectively. In addition, running duration of the Timer after the quantities are reached is also configurable on a network side.

For a 5th generation new radio (5th Generation New Radio, 5G NR) system, it was agreed in an NR discussion at a RAN1 meeting that a reference signal for performing RLM in NR was different from that in LTE, and a channel state information reference signal (Channel State Information Reference Signal, CSI-RS) and/or a synchronization signal block (Synchronisation Signal Block, SSB) would be used as a reference signal to perform RLM.

SSB and CSI-RS are two types of reference signals in NR.

Beam failure detection (Beam failure detection, BFD) also has an implementation process similar to that of RLM.

In a related art, a network configures, for a user, a radio link monitor (or BFD) parameter in a serving cell. When a reference signal of radio link monitor (or BFD) is reset, a running RLM (or BFD) counter or timer is reset. However: the related art does not specify what to do when there are a plurality of RLM processes (or BFD processes) for a plurality of RSs, bandwidth parts (Bandwidth part, BWP), cells, and the like; and the related art does not specify what happens to the RLM (or BFD) timer or counter when some or all RSs or RS sets are reset, or some or all BWPs are reconfigured or reset.

SUMMARY

Some embodiments of this disclosure provide a state detection method and a configuration method for network communication, a terminal, and a network device, to resolve a problem in a related art that reliability of network communication cannot be guaranteed, as there is not a solution to determine, when there are a plurality of RLM processes or a plurality of BFD processes for a plurality of RSs, BWPs, cells, and the like, which RLM process or which BFD process a terminal uses.

To resolve the foregoing technical problem, the following solutions are used in this disclosure.

According to a first aspect, some embodiments of this disclosure provide a state detection method for network communication, applied to a terminal, including:

obtaining a monitoring configuration parameter of a reference state, where the monitoring configuration parameter includes at least one set of reference state configuration parameters; and performing, based on the monitoring configuration parameter, a detection process corresponding to the reference state, where the reference state includes radio link monitor RLM and/or beam failure detection BFD.

According to a second aspect, some embodiments of this disclosure provide a detection configuration method for network communication, applied to a network device, including:

sending a monitoring configuration parameter of a reference state to a terminal, where the monitoring configuration parameter includes at least one set of reference state configuration parameters; and the reference state includes radio link monitor RLM and/or beam failure detection BFD.

According to a third aspect, some embodiments of this disclosure provide a terminal, including:

an obtaining module, configured to obtain a monitoring configuration parameter of a reference state, where the monitoring configuration parameter includes at least one set of reference state configuration parameters; and a measurement module, configured to perform, based on the monitoring configuration parameter, a detection process corresponding to the reference state, where the reference state includes radio link monitor RLM and/or beam failure detection BFD.

According to a fourth aspect, some embodiments of this disclosure provide a terminal, including a memory, a processor, and a computer program that is stored in the memory and capable of running on the processor. When the computer program is executed by the processor, the steps of the foregoing state detection method for network communication are implemented.

According to a fifth aspect, some embodiments of this disclosure provide a computer-readable storage medium, where the computer-readable storage medium stores a computer program. When the computer program is executed by a processor, the steps of the foregoing state detection method for network communication are implemented.

According to a sixth aspect, some embodiments of this disclosure provide a network device, including:

a sending module, configured to send a monitoring configuration parameter of a reference state to a terminal, where the monitoring configuration parameter includes at least one set of reference state configuration parameters; and the reference state includes radio link monitor RLM and/or beam failure detection BFD.

According to a seventh aspect, some embodiments of this disclosure provide a network device, including a memory, a processor, and a computer program that is stored in the memory and capable of running on the processor. When the computer program is executed by the processor, the steps of the foregoing detection configuration method for network communication are implemented.

According to an eighth aspect, some embodiments of this disclosure provide a computer-readable storage medium, where the computer-readable storage medium stores a computer program. When the computer program is executed by a processor, the steps of the foregoing detection configuration method for network communication are implemented.

Beneficial effects of this disclosure are:

in the foregoing solutions, the detection process corresponding to the RLM (or the BFD) is performed by using the monitoring configuration parameter of the RLM (or the BFD), to resolve the problem of determining, when there are a plurality of RLM processes (or a plurality of BFD processes) for a plurality of RSs, BWPs, cells, and the like, which RLM process (or which BFD process) the terminal uses. This improves a communication procedure and guarantees reliability of network communication.

DESCRIPTION OF EMBODIMENTS

To make the objectives, technical solutions, and advantages of this disclosure clearer, the following describes this disclosure in detail with reference to the drawings and specific embodiments.

Before description of some embodiments of this disclosure, some concepts used in the following description are explained first.

In a 5G NR system, a cell supports a maximum system bandwidth of up to 400 MHz, much higher than a maximum system bandwidth of 20 MHz in LTE, to support higher system and user throughput. However, supporting such a high system bandwidth is a huge challenge for implementation of UE, and is not conducive to implementation of low-cost UE. Therefore, the 5G NR system further supports dynamic and flexible bandwidth allocation. A system bandwidth is divided into a plurality of bandwidth parts (bandwidth part, BWP) to support access of narrowband terminal users or energy-saving-mode terminal users.

The 5G NR system supports an operating frequency band above 6 GHz, and may provide higher throughput for data transmission. Because a wavelength of a high frequency signal is short, in comparison with a low frequency band, more antenna array elements may be arranged on a panel of a same size, and a plurality of beams with higher directivity and narrower lobes are formed by using a beamforming technology. The 5G NR system uses a beam scanning technology to send a broadcast signal or system information to a terminal user in a cell.

In addition, an NR cell further supports configuration of different numerologies (that is, parameter configurations) for different bandwidths. If UE cannot support all numerologies of the cell, configuring a corresponding frequency band for the UE may be avoided when a BWP is configured for the UE.

A network configures a set of available BWPs of each cell for the UE by using RRC signaling, and may dynamically switch, by using L1 signaling, to a BWP that needs to be enabled, that is, deactivate a currently activated BWP when activating a BWP. In addition, BWP switching may further be controlled by using an inactive timer (bwp-inactiveTimer). Specifically, when the timer expires, the UE autonomously switches to a default (default) downlink (DownLink, DL) BWP or an initial (initial) DL BWP.

For a problem in a related art that reliability of network communication cannot be guaranteed, as there is not a solution to determine, when there are a plurality of RLM processes or a plurality of BFD processes for a plurality of RSs, BWPs, cells, and the like, which RLM process or which BFD process a terminal uses, this disclosure provides a state detection method and a configuration method for network communication, a terminal, and a network device.

Figure 1:
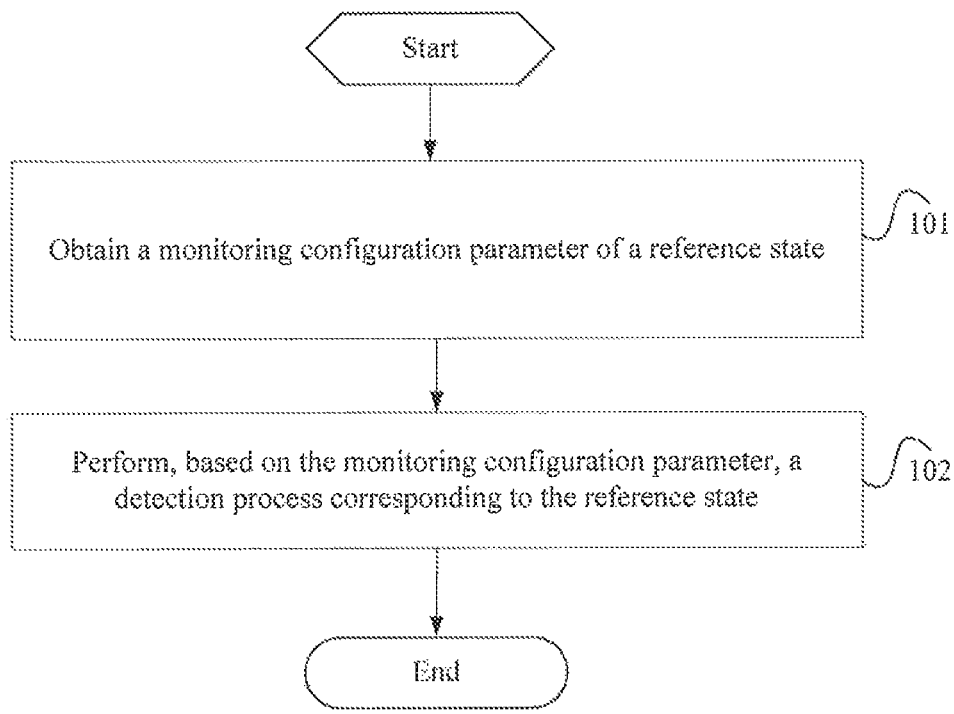
FIG. 1 is a schematic flowchart of a state detection method for network communication according to some embodiments of this disclosure.

As shown in FIG. 1, some embodiments of this disclosure provide a state detection method for network communication, applied to a terminal, including the following steps.

Step 101: Obtain a monitoring configuration parameter of a reference state.

It should be noted that the reference state includes radio link monitor (RLM) and/or beam failure detection (BFD).

Further, the monitoring configuration parameter includes at least one set of reference state configuration parameters. Specifically, the one set of reference state configuration parameters includes at least one of the following parameters:

a preset counter specific to the reference state or a timing length of a timer specific to the reference state.

When the reference state includes the RLM, the preset counter includes an out-of-sync counter and an in-sync counter, where the out-of-sync counter is used to count out-of-sync indications from a bottom layer, and the in-sync counter is used to count in-sync indications. When the reference state includes the BFD, the preset counter includes a beam failure instance counter, where the beam failure instance counter is used to count beam failure instances (Beam Failure Instance) indicated by a bottom layer.

Step 102: Perform, based on the monitoring configuration parameter, a detection process corresponding to the reference state.

It should be noted that, in some embodiments of this disclosure, when the monitoring configuration parameter includes the at least one set of reference state configuration parameters, an RLM process is performed based on a monitoring configuration parameter of the RLM, or a BFD process is performed based on a monitoring configuration parameter of the BFD, so that which RLM process (or which BFD process) the terminal uses may be determined.

Specifically, the monitoring configuration parameter includes at least one of the following information.

A1. One set of reference state configuration parameters configured for the terminal In this case, a reference state configuration parameter is configured for each terminal, that is, a terminal has one set of reference state configuration parameters. In other words, a terminal has one set of RLM parameters, or a terminal has one set of BFD parameters.

A2. At least one set of reference state configuration parameters configured for at least one reference signal (RS) of the terminal It should be noted that an RS includes an SSB and/or a CSI-RS.

In this case, a reference state configuration parameter is configured for an RS, that is, a reference signal of the terminal is configured with one set of reference state configuration parameters. It should be further noted that configuration of a reference state configuration parameter does not necessarily need to be strictly corresponding to an RS. Specifically, a configuration situation may be that each RS of the terminal is configured with one set of reference state configuration parameters, or may be that only some RSs are configured with reference state configuration parameters.

A3. At least one set of reference state configuration parameters configured for at least one RS set of the terminal In this case, a reference state configuration parameter is configured for an RS set, that is, an RS set of the terminal is configured with one set of reference state configuration parameters. It should be further noted that a reference state configuration parameter does not necessarily need to be strictly corresponding to an RS set. Specifically, a configuration situation may be that each RS set of the terminal is configured with one set of reference state configuration parameters, or may be that only some RS sets are configured with reference state configuration parameters.

A4. At least one set of reference state configuration parameters configured for at least one bandwidth part BWP of the terminal The at least one BWP includes at least one activated BWP and/or at least one configured BWP.

In this case, a reference state configuration parameter is configured for a BWP, that is, a BWP (the BWP may be an activated BWP of the terminal, or may be a configured BWP of the terminal) is configured with one set of reference state configuration parameters. It should be further noted that a reference state configuration parameter does not necessarily need to be strictly corresponding to a BWP. Specifically, a configuration situation may be that each BWP of the terminal is configured with one set of reference state configuration parameters, or may be that only some BWPs are configured with reference state configuration parameters.

A5. At least one set of reference state configuration parameters configured for at least one cell of the terminal The at least one cell includes at least one serving cell and/or at least one configured cell.

In this case, a reference state configuration parameter is configured for a cell, that is, a cell (the cell may be a serving cell of the terminal, or may be a configured cell of the terminal) is configured with one set of reference state configuration parameters. It should be further noted that a reference state configuration parameter does not necessarily need to be strictly corresponding to a cell. Specifically, a configuration situation may be that each cell of the terminal is configured with one set of reference state configuration parameters, or may be that only some cells are configured with reference state configuration parameters.

A6. At least one set of reference state configuration parameters configured for at least one carrier of the terminal In this case, a reference state configuration parameter is configured for a carrier, that is, a carrier of the terminal is configured with one set of reference state configuration parameters. It should be further noted that a reference state configuration parameter does not necessarily need to be strictly corresponding to a carrier. Specifically, a configuration situation may be that each carrier of the terminal is configured with one set of reference state configuration parameters, or may be that only some carriers are configured with reference state configuration parameters.

A7. At least one set of reference state configuration parameters configured for at least one bandwidth or at least one bandwidth combination of the terminal In this case, a reference state configuration parameter is configured for a bandwidth (or a bandwidth combination), that is, a bandwidth (or a bandwidth combination) of the terminal is configured with one set of reference state configuration parameters. It should be further noted that a reference state configuration parameter does not necessarily need to be strictly corresponding to a bandwidth (or a bandwidth combination). Specifically, a configuration situation may be that each bandwidth (or bandwidth combination) of the terminal is configured with one set of reference state configuration parameters, or may be that only some bandwidths (or bandwidth combinations) are configured with reference state configuration parameters.

It should be further noted that each set of reference state configuration parameters is corresponding to one detection process, that is, one set of RLM parameters is corresponding to one RLM process, and one set of BFD parameters is corresponding to one BFD process.

Further, a plurality of reference state processes may use a same reference state configuration parameter or different reference state configuration parameters. That a plurality of reference state processes are running means that a plurality of sets of timers are timing, and/or a plurality of sets of counters are counting.

Further, the performing, based on the monitoring configuration parameter, a detection process corresponding to the reference state includes at least one of the following manners.

B1. Running one reference state process configured for the terminal.

In other words, only one reference state process is run for a terminal. For example, when the reference state includes the RLM, one RLM process configured for the terminal is run; when the reference state includes the BFD, one BFD process configured for the terminal is run.

B2. Running at least one reference state process configured for an RS.

It should be noted that the RS is an RS configured for the terminal or an RS used by the terminal.

For example, when the reference state includes the RLM, at least one RLM process configured for the RS is run; when the reference state includes the BFD, at least one BFD process configured for the RS is run.

B3. Running at least one reference state process configured for an RS set.

It should be noted that the RS set is an RS set configured for the terminal or an RS set used by the terminal.

For example, when the reference state includes the RLM, at least one RLM process configured for the RS set is run;

when the reference state includes the BFD, at least one BFD process configured for the RS set is run.

B4. Running at least one reference state process configured for a BWP.

It should be noted that the BWP may be an activated BWP of the terminal, or may be a configured BWP of the terminal.

For example, when the reference state includes the RLM, at least one RLM process configured for the BWP is run; when the reference state includes the BFD, at least one BFD process configured for the BWP is run.

B5. Running at least one reference state process configured for a bandwidth.

For example, when the reference state includes the RLM, at least one RLM process configured for the bandwidth is run; when the reference state includes the BFD, at least one BFD process configured for the bandwidth is run.

B6. Running at least one reference state process configured for a bandwidth combination.

For example, when the reference state includes the RLM, at least one RLM process configured for the bandwidth combination is run; when the reference state includes the BFD, at least one BFD process configured for the bandwidth combination is run.

B7. Running at least one reference state process configured for a cell.

It should be noted that the cell may be a serving cell of the terminal, or may be a configured cell of the terminal.

For example, when the reference state includes the RLM, at least one RLM process configured for the cell is run; when the reference state includes the BFD, at least one BFD process configured for the cell is run.

B8. Running at least one reference state process configured for a carrier.

For example, when the reference state includes the RLM, at least one RLM process configured for the carrier is run; when the reference state includes the BFD, at least one BFD process configured for the carrier is run.

It should be noted that when there are at least two running reference state processes, the performing, based on the monitoring configuration parameter, a detection process corresponding to the reference state further includes at least one of the following manners.

C1. Each reference state process is corresponding to one RS.

In other words, in this case, a reference state process performs measurement only on one RS, and enables, based on a reference state configuration parameter corresponding to the reference state process, timing by a timer and counting by a counter. For example, when the reference state includes the RLM, an RLM process performs measurement only on one RS, enables timing by a timer, and enables counting by an out-of-sync counter and/or an in-sync counter; when the reference state includes the BFD, a BFD process performs measurement only on one RS, enables timing by a timer, and enables counting by a beam failure instance counter.

C2. Each reference state process is corresponding to one RS set.

In other words, in this case, a reference state process performs measurement only on one RS set, and enables, based on a reference state configuration parameter corresponding to the reference state process, timing by a timer and counting by a counter. For example, when the reference state includes the RLM, an RLM process performs measurement only on one RS set, enables timing by a timer, and enables counting by an out-of-sync counter and/or an in-sync counter; when the reference state includes the BFD, a BFD process performs measurement only on one RS set, enables timing by a timer, and enables counting by a beam failure instance counter.

C3. Each reference state process is corresponding to one BWP.

In other words, in this case, a reference state process performs measurement only on one BWP, and enables, based on a reference state configuration parameter corresponding to the reference state process, timing by a timer and counting by a counter. For example, when the reference state includes the RLM, an RLM process performs measurement only on one BWP, enables timing by a timer, and enables counting by an out-of-sync counter and/or an in-sync counter; when the reference state includes the BFD, a BFD process performs measurement only on one BWP, enables timing by a timer, and enables counting by a beam failure instance counter.

C4. Each reference state process is corresponding to one cell.

Specifically, in this case, the terminal is corresponding, in at least two cells, to at least two reference state processes.

Optionally, the at least two cells include a serving cell and/or a configured cell.

Optionally, the at least two cells include at least one primary cell and/or at least one secondary cell.

In other words, in this case, a reference state process performs measurement only on one cell, and enables, based on a reference state configuration parameter corresponding to the reference state process, timing by a timer and counting by a counter. For example, when the reference state includes the RLM, an RLM process performs measurement only on one cell, enables timing by a timer, and enables counting by an out-of-sync counter and/or an in-sync counter; when the reference state includes the BFD, a BFD process performs measurement only on one cell, enables timing by a timer, and enables counting by a beam failure instance counter.

C5. Each reference state process is corresponding to one carrier.

In other words, in this case, a reference state process performs measurement only on one carrier, and enables, based on a reference state configuration parameter corresponding to the reference state process, timing by a timer and counting by a counter. For example, when the reference state includes the RLM, an RLM process performs measurement only on one carrier, enables timing by a timer, and enables counting by an out-of-sync counter and/or an in-sync counter; when the reference state includes the BFD, a BFD process performs measurement only on one carrier, enables timing by a timer, and enables counting by a beam failure instance counter.

C6. Each reference state process is corresponding to one bandwidth.

In other words, in this case, a reference state process performs measurement only on one bandwidth, and enables, based on a reference state configuration parameter corresponding to the reference state process, timing by a timer and counting by a counter. For example, when the reference state includes the RLM, an RLM process performs measurement only on one bandwidth, enables timing by a timer, and enables counting by an out-of-sync counter and/or an in-sync counter; when the reference state includes the BFD, a BFD process performs measurement only on one bandwidth, enables timing by a timer, and enables counting by a beam failure instance counter.

C7. Each reference state process is corresponding to one bandwidth combination.

In other words, in this case, a reference state process performs measurement only on one bandwidth combination, and enables, based on a reference state configuration parameter corresponding to the reference state process, timing by a timer and counting by a counter. For example, when the reference state includes the RLM, an RLM process performs measurement only on one bandwidth combination, enables timing by a timer, and enables counting by an out-of-sync counter and/or an in-sync counter; when the reference state includes the BFD, a BFD process performs measurement only on one bandwidth combination, enables timing by a timer, and enables counting by a beam failure instance counter.

Further, the performing, based on the monitoring configuration parameter, a detection process corresponding to the reference state further includes:

when at least one reference state process is running and when a reference state reset condition exists, resetting a target reference state.

It should be noted that the target reference state includes one of the following information:

D1. a reference state configured for at least one of the terminal, the RS, the RS set, the BWP, the cell, the carrier, the bandwidth, or the bandwidth combination; and D2. a reference state configured for at least one of an RS, an RS set, a BWP, a cell, a carrier, a bandwidth, or a bandwidth combination that have been reset.

Specifically, the reference state reset condition includes one of the following cases.

D1. At least one target resource is reset, reconfigured, activated, deactivated, or switched.

It should be noted that the target resource includes at least one of the RS, the RS set, the BWP, the cell, the carrier, the bandwidth, or the bandwidth combination.

D2. Configuration information corresponding to the reference state is reset or reconfigured.

It should be noted that the configuration information includes at least one of the following information:

E1. a reference state configuration parameter; or

E2. a target resource corresponding to the reference state.

It should be further noted that the resetting a target reference state includes:

resetting at least some parameters of reference state configuration parameters corresponding to the target reference state.

Specifically, the resetting at least some parameters includes at least one of the following manners:

F1. resetting or stopping a timer; or

F2. resetting a preset counter.

When the reference state includes the RLM, the preset counter includes an out-of-sync counter and an in-sync counter. When the reference state includes the BFD, the preset counter includes a beam failure instance counter.

In this case, all parameters included in one set of reference state configuration parameters are reset, or some parameters included in one set of reference state configuration parameters are reset. For example, when the reference state includes the RLM, the timer is reset, and meanwhile the out-of-sync counter and the in-sync counter are reset (that is, count values of the counters are set to initial values).

That a reference state includes RLM is used as an example in the following to specifically describe a specific implementation process of some embodiments of this disclosure.

S1. Obtain a monitoring configuration parameter of RLM configured by a network device.

The monitoring configuration parameter of the RLM includes at least one of one set of RLM configuration parameters configured for each terminal, at least one set of RLM configuration parameters configured for at least one RS of a terminal, at least one set of RLM configuration parameters configured for at least one RS set of a terminal, at least one set of RLM configuration parameters configured for at least one BWP of a terminal, at least one set of RLM configuration parameters configured for at least one cell of a terminal, at least one set of RLM configuration parameters configured for at least one carrier of a terminal, and at least one set of RLM configuration parameters configured for at least one bandwidth or at least one bandwidth combination of a terminal.

S2. Run an RLM process.

Specific implementation of this step includes at least one of running one RLM process configured for the terminal, running at least one RLM process configured for an RS, running at least one RLM process configured for an RS set, running at least one RLM process configured for a BWP, running at least one RLM process configured for a bandwidth, running at least one RLM process configured for a bandwidth combination, running at least one RLM process configured for a cell, or running at least one RLM process configured for a carrier.

S3. Reset the RLM process.

Specifically, when at least one of the at least one RS, the at least one RS set, the at least one BWP, the at least one cell, the at least one carrier, the at least one bandwidth, or the at least one bandwidth combination is reset, reconfigured, activated, deactivated, or switched, or when an RLM configuration parameter corresponding to the RLM is reset or reconfigured, or when at least one of the RS, the RS set, the BWP, the cell, the carrier, the bandwidth, or the bandwidth combination corresponding to the RLM is reset or reconfigured, resetting the RLM process is triggered.

Resetting the RLM process includes stopping a timer (that is, stopping timing by the timer) and resetting an out-of-sync counter and/or an in-sync counter.

When a reference state includes BFD, an execution process of the terminal is similar to the execution process of the terminal performed when the reference state includes the RLM. Details are not described herein again.

It should be noted that the foregoing embodiment of this disclosure may be used in 5G, or eLTE, or another scenario with similar configuration.

In some embodiments of this disclosure, a detection process corresponding to the RLM (or the BFD) is performed by using the monitoring configuration parameter of the RLM (or the BFD), to resolve a problem of determining, when there are a plurality of RLM processes (or a plurality of BFD processes) for a plurality of RSs, BWPs, cells, and the like, which RLM process (or which BFD process) the terminal uses. This improves a communication procedure and guarantees reliability of network communication.

Figure 2:
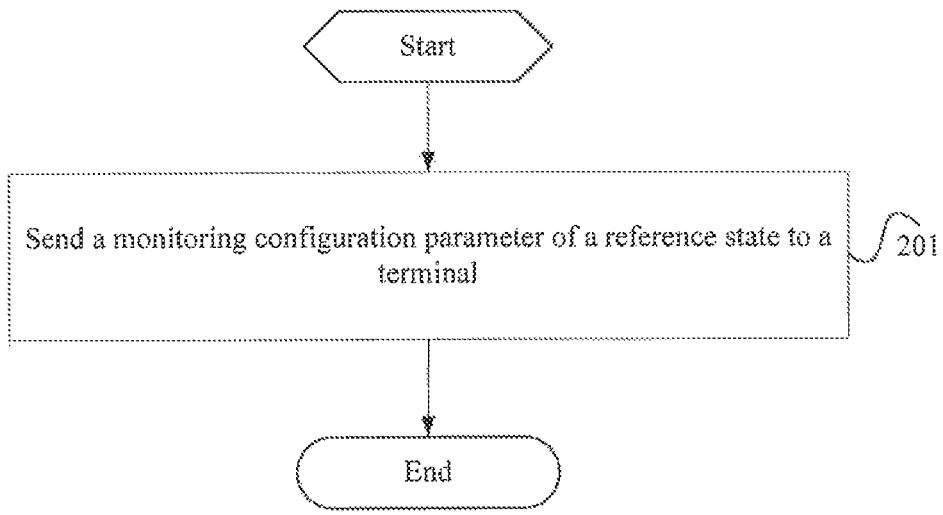
FIG. 2 is a schematic flowchart of a detection configuration method for network communication according to some embodiments of this disclosure.

Specifically, as shown in FIG. 2, FIG. 2 is a schematic flowchart of a detection configuration method for network communication according to some embodiments of this disclosure. The detection configuration method for network communication is applied to a network device, and includes the following step.

Step 201: Send a monitoring configuration parameter of a reference state to a terminal, where the monitoring configuration parameter includes at least one set of reference state configuration parameters.

The reference state includes radio link monitor RLM and/or beam failure detection BFD.

Specifically, the monitoring configuration parameter includes at least one of the following information:

one set of reference state configuration parameters configured for the terminal;

at least one set of reference state configuration parameters configured for at least one reference signal RS of the terminal;

at least one set of reference state configuration parameters configured for at least one RS set of the terminal;

at least one set of reference state configuration parameters configured for at least one bandwidth part BWP of the terminal;

at least one set of reference state configuration parameters configured for at least one cell of the terminal;

at least one set of reference state configuration parameters configured for at least one carrier of the terminal; or at least one set of reference state configuration parameters configured for at least one bandwidth or at least one bandwidth combination of the terminal.

The at least one BWP includes at least one activated BWP and/or at least one configured BWP, and the at least one cell includes at least one serving cell and/or at least one configured cell.

Specifically, the one set of reference state configuration parameters includes at least one of the following parameters:

a preset counter specific to the reference state or a timing length of a timer specific to the reference state.

When the reference state includes the RLM, the preset counter includes an out-of-sync counter and an in-sync counter. When the reference state includes the BFD, the preset counter includes a beam failure instance counter.

It should be noted that all descriptions of the network device in the foregoing embodiment are applicable to the embodiments of the detection configuration method, for network communication, applied to the network device, and a technical effect that is the same as that in the foregoing embodiment can also be achieved.

Figure 3:
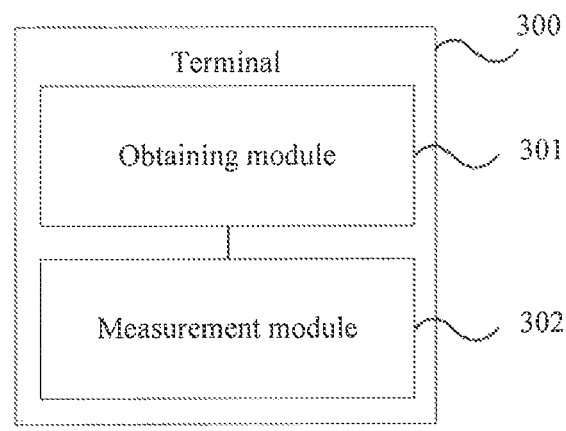
FIG. 3 is a schematic module diagram of a terminal according to some embodiments of this disclosure.

As shown in FIG. 3, some embodiments of this disclosure provide a terminal 300, including:

an obtaining module 301, configured to obtain a monitoring configuration parameter of a reference state, where the monitoring configuration parameter includes at least one set of reference state configuration parameters; and a measurement module 302, configured to perform, based on the monitoring configuration parameter, a detection process corresponding to the reference state.

The reference state includes radio link monitor RLM and/or beam failure detection BFD.

Specifically, the monitoring configuration parameter includes at least one of the following information:

one set of reference state configuration parameters configured for the terminal;

at least one set of reference state configuration parameters configured for at least one reference signal RS of the terminal;

at least one set of reference state configuration parameters configured for at least one RS set of the terminal;

at least one set of reference state configuration parameters configured for at least one bandwidth part BWP of the terminal;

at least one set of reference state configuration parameters configured for at least one cell of the terminal;

at least one set of reference state configuration parameters configured for at least one carrier of the terminal; or at least one set of reference state configuration parameters configured for at least one bandwidth or at least one bandwidth combination of the terminal.

The at least one BWP includes at least one activated BWP and/or at least one configured BWP, and the at least one cell includes at least one serving cell and/or at least one configured cell.

Specifically, the one set of reference state configuration parameters includes at least one of the following parameters:

a preset counter specific to the reference state or a timing length of a timer specific to the reference state.

When the reference state includes the RLM, the preset counter includes an out-of-sync counter and an in-sync counter. When the reference state includes the BFD, the preset counter includes a beam failure instance counter.

Further, the measurement module 302 is configured to perform at least one of the following manners:

run one reference state process configured for the terminal;

run at least one reference state process configured for an RS;

run at least one reference state process configured for an RS set;

run at least one reference state process configured for a BWP;

run at least one reference state process configured for a bandwidth;

run at least one reference state process configured for a bandwidth combination;

run at least one reference state process configured for a cell; or run at least one reference state process configured for a carrier.

Optionally, when there are at least two running reference state processes, the measurement module is further configured to perform at least one of the following manners:

each reference state process being corresponding to one RS;

each reference state process being corresponding to one RS set;

each reference state process being corresponding to one BWP;

each reference state process being corresponding to one cell;

each reference state process being corresponding to one carrier;

each reference state process being corresponding to one bandwidth; or each reference state process being corresponding to one bandwidth combination.

Further, the each reference state process being corresponding to one cell includes:

the terminal being corresponding, in at least two cells, to at least two reference state processes.

Optionally, the at least two cells include a serving cell and/or a configured cell.

Optionally, the at least two cells include at least one primary cell and/or at least one secondary cell.

Optionally, the measurement module 302 further includes:

a setting unit, configured to: when at least one reference state process is running and when a reference state reset condition exists, reset a target reference state.

The reference state reset condition includes one of the following cases:

at least one target resource is reset, reconfigured, activated, deactivated, or switched; and configuration information corresponding to the reference state is reset or reconfigured.

The target resource includes at least one of the RS, the RS set, the BWP, the cell, the carrier, the bandwidth, or the bandwidth combination.

Specifically, the configuration information includes at least one of the following information:

a reference state configuration parameter; or a target resource corresponding to the reference state.

Specifically, the target reference state includes one of the following information:

a reference state configured for at least one of the terminal, the RS, the RS set, the BWP, the cell, the carrier, the bandwidth, or the bandwidth combination; and a reference state configured for at least one of an RS, an RS set, a BWP, a cell, a carrier, a bandwidth, or a bandwidth combination that have been reset.

Further, the setting unit is configured to:

reset at least some parameters of reference state configuration parameters corresponding to the target reference state.

Specifically, the resetting at least some parameters includes at least one of the following manners:

resetting or stopping a timer; or resetting a preset counter.

When the reference state includes the RLM, the preset counter includes an out-of-sync counter and an in-sync counter. When the reference state includes the BFD, the preset counter includes a beam failure instance counter.

It should be noted that this terminal embodiment is corresponding to the terminal in the foregoing state detection method, for network communication, applied to a terminal side. All implementations in the foregoing embodiments are applicable to this terminal embodiment, and a technical effect that is the same as that in the foregoing embodiments can also be achieved.

Figure 4:
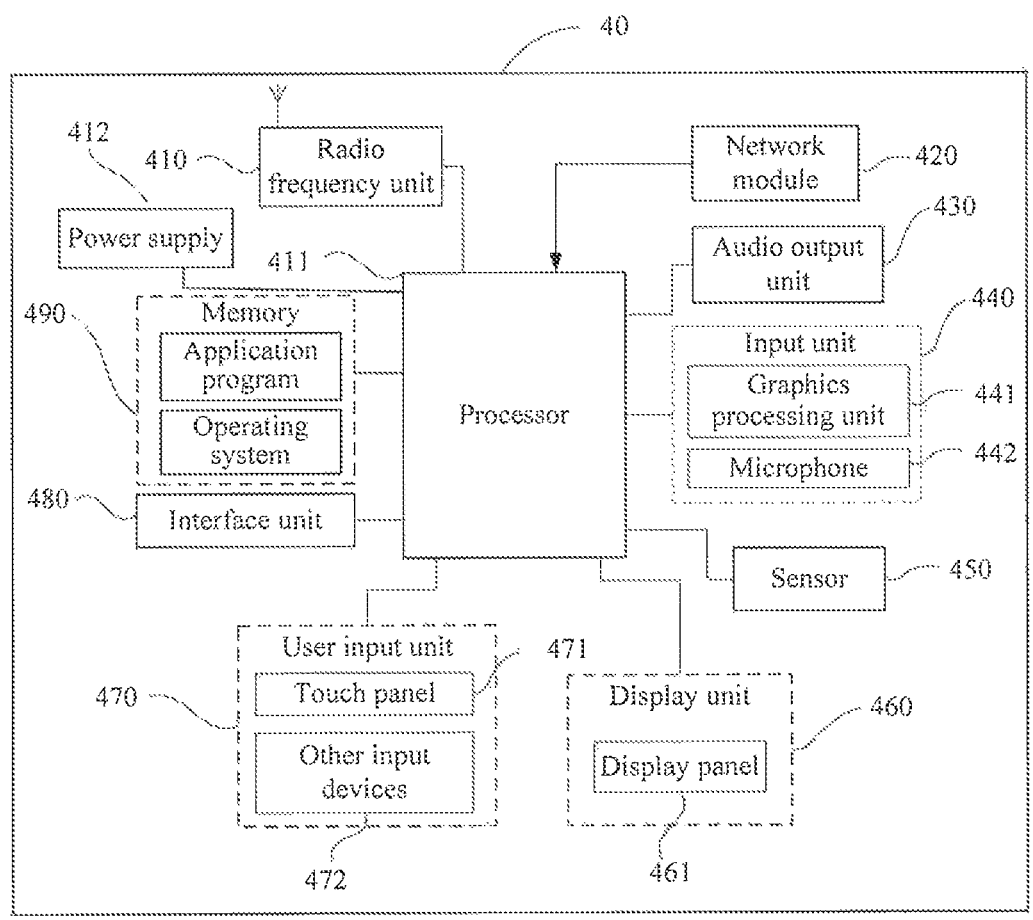
FIG. 4 is a structural block diagram of a terminal according to some embodiments of this disclosure.

FIG. 4 is a schematic diagram of a hardware structure of a terminal for implementing some embodiments of this disclosure.

The terminal 40 includes but is not limited to components such as a radio frequency unit 410, a network module 420, an audio output unit 430, an input unit 440, a sensor 450, a display unit 460, a user input unit 470, an interface unit 480, a memory 490, a processor 411, and a power supply 412. A person skilled in the art may understand that the structure of the terminal shown in FIG. 4 does not constitute a limitation on the terminal. The terminal may include more or fewer components than those shown in the figure, or a combination of some components, or components disposed in a different manner. In some embodiments of this disclosure, the terminal includes but is not limited to a mobile phone, a tablet computer, a laptop computer, a palmtop computer, an in-vehicle terminal, a wearable device, a pedometer, or the like.

The processor 411 is configured to: obtain a monitoring configuration parameter of a reference state, where the monitoring configuration parameter includes at least one set of reference state configuration parameters; and perform, based on the monitoring configuration parameter, a detection process corresponding to the reference state.

The reference state includes radio link monitor RLM and/or beam failure detection BFD.

The terminal in some embodiments of this disclosure performs a detection process corresponding to the RLM (or the BFD) by using a monitoring configuration parameter of the RLM (or the BFD), to resolve a problem of determining, when there are a plurality of RLM processes (or a plurality of BFD processes) for a plurality of RSs, BWPs, cells, and the like, which RLM process (or which BFD process) the terminal uses. This improves a communication procedure and guarantees reliability of network communication.

It should be understood that, in some embodiments of this disclosure, the radio frequency unit 410 may be configured to send and receive signals in an information sending and receiving process or in a call process. Specifically, after receiving downlink data from a network device, the radio frequency unit 410 sends the downlink data to the processor 411 for processing, and in addition, sends uplink data to the network device. Generally, the radio frequency unit 410 includes but is not limited to an antenna, at least one amplifier, a transceiver, a coupler, a low noise amplifier, a duplexer, and the like. In addition, the radio frequency unit 410 may further communicate with a network and another device through a wireless communications system.

The terminal provides wireless broadband Internet access for a user by using the network module 420, for example, helps the user send and receive e-mails, browse web pages, and access streaming media.

The audio output unit 430 may convert audio data received by the radio frequency unit 410 or the network module 420 or stored in the memory 490 into an audio signal, and output the audio signal as a sound. In addition, the audio output unit 430 may further provide an audio output (for example, a call signal reception sound or a message reception sound) related to a specific function performed by the terminal 40. The audio output unit 430 includes a speaker, a buzzer, a telephone receiver, and the like.

The input unit 440 is configured to receive an audio or video signal. The input unit 440 may include a graphics processing unit (Graphics Processing Unit, GPU) 441 and a microphone 442. The graphics processing unit 441 processes image data of a still picture or a video obtained by an image capture apparatus (for example, a camera) in a video capture mode or an image capture mode. A processed image frame may be displayed on the display unit 460. An image frame processed by the graphics processing unit 441 may be stored in the memory 490 (or another storage medium) or sent by the radio frequency unit 410 or the network module 420. The microphone 442 may receive a sound and may process the sound into audio data. The processed audio data may be converted, in a telephone call mode, into a format that can be sent to a mobile communications network device through the radio frequency unit 410, for outputting.

The terminal 40 further includes at least one sensor 450, for example, a light sensor, a motion sensor, and another sensor. Specifically, the light sensor includes an ambient light sensor and a proximity sensor. The ambient light sensor may adjust luminance of a display panel 461 based on brightness of ambient light. The proximity sensor may turn off the display panel 461 and/or backlight when the terminal 40 is moved to an ear. As a type of motion sensor, an accelerometer sensor may detect acceleration magnitudes in various directions (generally three axes), and may detect a magnitude and a direction of gravity when the terminal is stationary, and may be configured to recognize a posture of the terminal (such as switching between landscape and portrait, a related game, and magnetometer posture calibration), implement vibration recognition related functions (such as a pedometer and stroke), and the like. The sensor 450 may further include a fingerprint sensor, a pressure sensor, an iris sensor, a molecular sensor, a gyroscope, a barometer, a hygrometer, a thermometer, an infrared sensor, and the like. Details are not described herein.

The display unit 460 is configured to display information input by the user or information provided for the user. The display unit 460 may include the display panel 461. The display panel 461 may be configured in a form of a liquid crystal display (Liquid Crystal Display, LCD), an organic light-emitting diode (Organic Light-Emitting Diode, OLED), or the like.

The user input unit 470 may be configured to receive input digit or character information and generate key signal input related to user setting and function control of the terminal. Specifically, the user input unit 470 includes a touch panel 471 and other input devices 472. The touch panel 471, also referred to as a touchscreen, may collect a touch operation performed by the user on or near the touch panel (for example, an operation performed by the user on the touch panel 471 or near the touch panel 471 by using any appropriate object or accessory such as a finger or a stylus). The touch panel 471 may include two parts: a touch detection apparatus and a touch controller. The touch detection apparatus detects a touch position of the user, detects a signal generated by a touch operation, and transmits the signal to the touch controller. The touch controller receives touch information from the touch detection apparatus, converts the touch information into touch point coordinates, sends the coordinates to the processor 411, and receives and executes a command sent by the processor 411. In addition, the touch panel 471 may be implemented in a plurality of forms, for example, a resistive, capacitive, infrared, or surface acoustic wave touch panel. The user input unit 470 may further include the other input devices 472 in addition to the touch panel 471. Specifically, the other input devices 472 may include but are not limited to a physical keyboard, a function key (such as a volume control key or an on/off key), a trackball, a mouse, a joystick, or the like. Details are not described herein.

Further, the touch panel 471 may cover the display panel 461. After detecting a touch operation on or near the touch panel 471, the touch panel 471 transmits the touch operation to the processor 411 to determine a type of a touch event. Then the processor 411 provides a corresponding visual output on the display panel 461 based on the type of the touch event. Although the touch panel 471 and the display panel 461 are used as two independent components to implement input and output functions of the terminal in FIG. 4, the touch panel 471 and the display panel 461 may be integrated to implement the input and output functions of the terminal in some embodiments. This is not specifically limited herein.

The interface unit 480 is an interface for connecting an external apparatus to the terminal 40. For example, the external apparatus may include a wired or wireless headphone port, an external power (or battery charger) port, a wired or wireless data port, a memory card port, a port used for connecting an apparatus having an identification module, an audio input/output (I/O) port, a video I/O port, an earphone port, or the like. The interface unit 480 may be configured to receive an input (for example, data information or power) from the external apparatus, and transmit the received input to one or more components in the terminal 40, or may be configured to transmit data between the terminal 40 and the external apparatus.

The memory 490 may be configured to store a software program and various data. The memory 490 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 490 may include a high-speed random access memory, or may include a non-volatile memory, for example, at least one magnetic disk storage device, a flash memory device, or another non-volatile solid-state storage device.

The processor 411 is a control center of the terminal. The processor 411 uses various interfaces and lines to connect all parts of the entire terminal. By running or executing the software program and/or a module stored in the memory 490 and invoking data stored in the memory 490, the processor 411 performs various functions of the terminal and processes data, thereby performing overall monitoring on the terminal. The processor 411 may include one or more processing units. Optionally, the processor 411 may integrate an application processor and a modem processor. The application processor mainly processes the operating system, a user interface, an application program, and the like. The modem processor mainly processes wireless communication. It can be understood that the modem processor may alternatively not be integrated into the processor 411.

The terminal 40 may further include the power supply 412 (for example, a battery) supplying power to all components. Optionally, the power supply 412 may be logically connected to the processor 411 through a power management system. In this way, functions such as charge management, discharge management, and power consumption management are implemented by using the power management system.

In addition, the terminal 40 includes some functional modules that are not illustrated. Details are not described herein.

Optionally, some embodiments of this disclosure further provide a terminal, including a processor 411, a memory 490, and a computer program that is stored in the memory 490 and capable of running on the processor 411. When the computer program is executed by the processor 411, the processes in the embodiments of the state detection method, for network communication, applied to a terminal side are implemented, and a same technical effect can be achieved. To avoid repetition, details are not described herein again.

Some embodiments of this disclosure further provide a computer-readable storage medium. The computer-readable storage medium stores a computer program. When the computer program is executed by a processor, the processes in the embodiments of the state detection method, for network communication, applied to a terminal side are implemented, and a same technical effect can be achieved. To avoid repetition, details are not described herein again. The computer-readable storage medium is, for example, a read-only memory (Read-Only Memory, ROM for short), a random access memory (Random Access Memory, RAM for short), a magnetic disk, or an optical disc.

Figure 5:
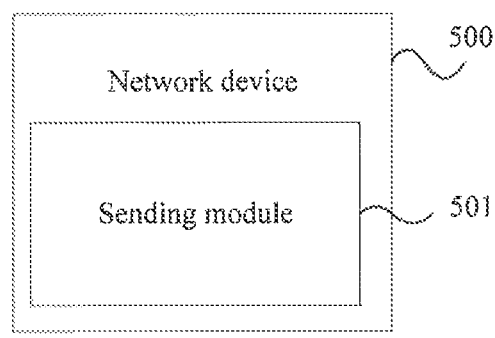
FIG. 5 is a schematic module diagram of a network device according to some embodiments of this disclosure.

As shown in FIG. 5, some embodiments of this disclosure further provide a network device 500, including:

a sending module 501, configured to send a monitoring configuration parameter of a reference state to a terminal, where the monitoring configuration parameter includes at least one set of reference state configuration parameters.

The reference state includes radio link monitor RLM and/or beam failure detection BFD.

Specifically, the monitoring configuration parameter includes at least one of the following information:

one set of reference state configuration parameters configured for the terminal;

at least one set of reference state configuration parameters configured for at least one reference signal RS of the terminal;

at least one set of reference state configuration parameters configured for at least one RS set of the terminal;

at least one set of reference state configuration parameters configured for at least one bandwidth part BWP of the terminal;

at least one set of reference state configuration parameters configured for at least one cell of the terminal;

at least one set of reference state configuration parameters configured for at least one carrier of the terminal; or at least one set of reference state configuration parameters configured for at least one bandwidth or at least one bandwidth combination of the terminal.

Specifically, the at least one BWP includes at least one activated BWP and/or at least one configured BWP, and the at least one cell includes at least one serving cell and/or at least one configured cell.

Specifically, the one set of reference state configuration parameters includes at least one of the following parameters:

a preset counter specific to the reference state or a timing length of a timer specific to the reference state.

When the reference state includes the RLM, the preset counter includes an out-of-sync counter and an in-sync counter. When the reference state includes the BFD, the preset counter includes a beam failure instance counter.

It should be noted that this network device embodiment is corresponding to the network device in the foregoing detection configuration method, for network communication, applied to a network device side. All implementations in the foregoing embodiments are applicable to this network device embodiment, and a technical effect that is the same as that in the foregoing embodiments can also be achieved.

Some embodiments of this disclosure further provide a network device, including a memory, a processor, and a computer program that is stored in the memory and capable of running on the processor. When the computer program is executed by the processor, the processes in the foregoing embodiments of the detection configuration method for network communication are implemented, and a same technical effect can be achieved. To avoid repetition, details are not described herein again.

Some embodiments of this disclosure further provide a computer-readable storage medium, where the computer-readable storage medium stores a computer program. When the computer program is executed by a processor, the processes in the foregoing embodiments of the detection configuration method for network communication are implemented, and a same technical effect can be achieved. To avoid repetition, details are not described herein again. The computer-readable storage medium is, for example, a read-only memory (Read-Only Memory, ROM for short), a random access memory (Random Access Memory, RAM for short), a magnetic disk, or an optical disc.

Figure 6:
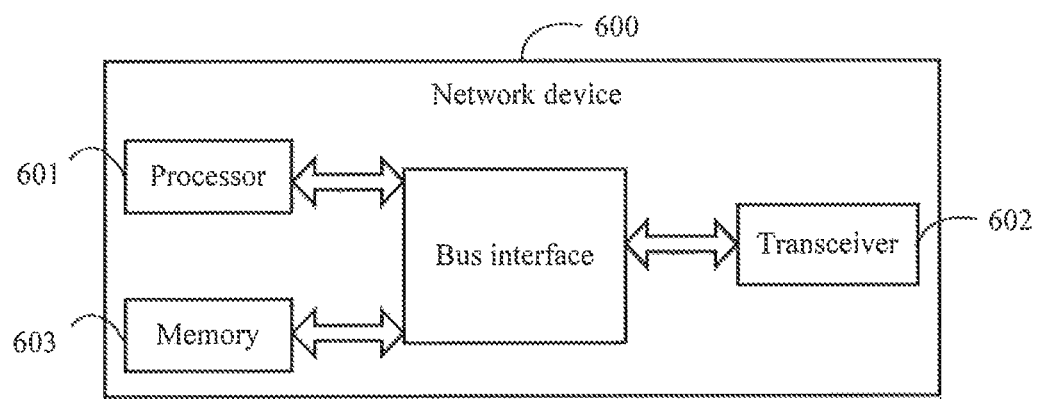
FIG. 6 is a structural block diagram of a network device according to some embodiments of this disclosure.

FIG. 6 is a structural diagram of a network device according to some embodiments of this disclosure. Details of the foregoing detection configuration method, for network communication, applied to a network device side can be implemented, with a same effect achieved. As shown in FIG. 6, a network device 600 includes a processor 601, a transceiver 602, a memory 603, and a bus interface.

The processor 601 is configured to read a program in the memory 603 to perform the following process:

send a monitoring configuration parameter of a reference state to a terminal by the transceiver 602, where the monitoring configuration parameter includes at least one set of reference state configuration parameters.

The reference state includes radio link monitor RLM and/or beam failure detection BFD.

In FIG. 6, a bus architecture may include any quantity of interconnect buses and bridges, specifically for interconnecting various circuits of one or more processors represented by the processor 601 and a memory represented by the memory 603. The bus architecture may further interconnect various other circuits such as a peripheral device, a voltage regulator, and a power management circuit. These are all well known in the art, and therefore are not further described in this specification. The bus interface provides an interface. The transceiver 602 may be a plurality of components, that is, the transceiver 602 includes a transmitter and a receiver, and provides a unit for communicating with various other apparatuses on a transmission medium.

The processor 601 is responsible for bus architecture management and general processing. The memory 603 may store data used when the processor 601 performs an operation.

Specifically, the monitoring configuration parameter includes at least one of the following information:

one set of reference state configuration parameters configured for the terminal;

at least one set of reference state configuration parameters configured for at least one reference signal RS of the terminal;

at least one set of reference state configuration parameters configured for at least one RS set of the terminal;

at least one set of reference state configuration parameters configured for at least one bandwidth part BWP of the terminal;

at least one set of reference state configuration parameters configured for at least one cell of the terminal;

at least one set of reference state configuration parameters configured for at least one carrier of the terminal; or at least one set of reference state configuration parameters configured for at least one bandwidth or at least one bandwidth combination of the terminal.

Specifically, the at least one BWP includes at least one activated BWP and/or at least one configured BWP, and the at least one cell includes at least one serving cell and/or at least one configured cell.

Specifically, the one set of reference state configuration parameters includes at least one of the following parameters:

a preset counter specific to the reference state or a timing length of a timer specific to the reference state.

When the reference state includes the RLM, the preset counter includes an out-of-sync counter and an in-sync counter. When the reference state includes the BFD, the preset counter includes a beam failure instance counter.

The network device may be a base transceiver station (Base Transceiver Station, BTS for short) in a global system for mobile communications (Global System of Mobile communication, GSM for short) or code division multiple access (Code Division Multiple Access, CDMA for short), or may be a NodeB (NodeB, NB for short) in wideband code division multiple access (Wideband Code Division Multiple Access, WCDMA for short), or may be an evolved NodeB (Evolutional Node B, eNB or eNodeB for short) in LTE, or a relay station, or an access point, or a base station in a future 5G network, or the like. This is not limited herein.

The foregoing descriptions are specific implementations of this disclosure. It should be noted that a person of ordinary skill in the art may make several improvements or refinements without departing from the principle described in this disclosure, and the improvements or refinements shall fall within the protection scope of this disclosure.

What is claimed is:

1. A state detection method for network communication, applied to a terminal, comprising:

obtaining a monitoring configuration parameter of a reference state, wherein the monitoring configuration parameter comprises at least one set of reference state configuration parameters; and performing, based on the monitoring configuration parameter, a detection process corresponding to the reference state, wherein the reference state comprises radio link monitor (RLM) and/or beam failure detection (BFD);

wherein the performing, based on the monitoring configuration parameter, the detection process corresponding to the reference state, comprises:

performing the detection process to a plurality of RLM processes and/or a plurality of BFD processes based on the monitoring configuration parameter, wherein each of the plurality of RLM processes or BFD processes corresponds to one set of reference state configuration parameters, wherein at least some of the plurality of RLM processes are different from each other, wherein at least some of the plurality of BFD processes are different from each other;

wherein the monitoring configuration parameter comprises at least one of the following information:

a set of reference state configuration parameters configured for each reference signal (RS) of the terminal;

a set of reference state configuration parameters configured for each RS set of the terminal;

a set of reference state configuration parameters configured for each bandwidth part (BWP) of the terminal;

a set of reference state configuration parameters configured for the cell of the terminal;

a set of reference state configuration parameters configured for each carrier of the terminal; or a set of reference state configuration parameters configured for each bandwidth or at least one bandwidth combination of the terminal.

2. The state detection method for network communication according to claim 1, wherein the at least one BWP comprises at least one activated BWP and/or at least one configured BWP, and the at least one cell comprises at least one serving cell and/or at least one configured cell.

3. The state detection method for network communication according to claim 1, wherein the one set of reference state configuration parameters comprises at least one of the following parameters:

a preset counter specific to the reference state or a timing length of a timer specific to the reference state, wherein when the reference state comprises the RLM, the preset counter comprises an out-of-sync counter and an in-sync counter; and when the reference state comprises the BFD, the preset counter comprises a beam failure instance counter.

4. The state detection method for network communication according to claim 1, wherein the performing, based on the monitoring configuration parameter, a detection process corresponding to the reference state comprises at least one of the following manners:

running one reference state process configured for the terminal;

running at least one reference state process configured for an RS;

running at least one reference state process configured for an RS set;

running at least one reference state process configured for a BWP;

running at least one reference state process configured for a bandwidth;

running at least one reference state process configured for a bandwidth combination;

running at least one reference state process configured for a cell; or running at least one reference state process configured for a carrier.

5. The state detection method for network communication according to claim 4, wherein when there are at least two running reference state processes, the performing, based on the monitoring configuration parameter, a detection process corresponding to the reference state further comprises at least one of the following manners:

each reference state process being corresponding to one RS;

each reference state process being corresponding to one RS set;

each reference state process being corresponding to one BWP;

each reference state process being corresponding to one cell;

each reference state process being corresponding to one carrier;

each reference state process being corresponding to one bandwidth; or each reference state process being corresponding to one bandwidth combination.

6. The state detection method for network communication according to claim 5, wherein the each reference state process being corresponding to one cell comprises:

the terminal being corresponding, in at least two cells, to at least two reference state processes.

7. The state detection method for network communication according to claim 6, wherein the at least two cells comprise a serving cell and/or a configured cell.

8. The state detection method for network communication according to claim 6, wherein the at least two cells comprise at least one primary cell and/or at least one secondary cell.

9. The state detection method for network communication according to claim 4, wherein the performing, based on the monitoring configuration parameter, a detection process corresponding to the reference state further comprises:

when at least one reference state process is running and when a reference state reset condition exists, resetting a target reference state.

10. The state detection method for network communication according to claim 9, wherein the reference state reset condition comprises one of the following cases:

at least one target resource is reset, reconfigured, activated, deactivated, or switched; and configuration information corresponding to the reference state is reset or reconfigured, wherein the target resource comprises at least one of the RS, the RS set, the BWP, the cell, the carrier, the bandwidth, or the bandwidth combination.

11. The state detection method for network communication according to claim 10, wherein the configuration information comprises at least one of the following information:

a reference state configuration parameter; or a target resource corresponding to the reference state.

12. The state detection method for network communication according to claim 9, wherein the target reference state comprises one of the following information:

a reference state configured for at least one of the terminal, the RS, the RS set, the BWP, the cell, the carrier, the bandwidth, or the bandwidth combination; and a reference state configured for at least one of an RS, an RS set, a BWP, a cell, a carrier, a bandwidth, or a bandwidth combination that have been reset.

13. The state detection method for network communication according to claim 9, wherein the resetting a target reference state comprises:
resetting at least some parameters of reference state configuration parameters corresponding to the target reference state.

14. The state detection method for network communication according to claim 13, wherein the resetting at least some parameters comprises at least one of the following manners:
resetting or stopping a timer; or
resetting a preset counter, wherein
when the reference state comprises the RLM, the preset counter comprises an out-of-sync counter and an in-sync counter; and when the reference state comprises the BFD, the preset counter comprises a beam failure instance counter.

15. A non-transitory computer-readable storage medium, wherein the computer-readable storage medium stores a computer program, and when the computer program is executed by a processor, the steps of the state detection method for network communication according to claim 1 are implemented.

16. A detection configuration method for network communication, applied to a network device, wherein the method comprises:
sending a monitoring configuration parameter of a reference state to a terminal, wherein the monitoring configuration parameter comprises at least one set of reference state configuration parameters; and
the reference state comprises radio link monitor (RLM) and/or beam failure detection (BFD);
wherein a detection process to a plurality of RLM processes and/or a plurality of BFD processes are performed on the basis of the monitoring configuration parameter, wherein each of the plurality of RLM processes or BFD processes corresponds to one set of reference state configuration parameters, wherein at least some of the plurality of RLM processes are different from each other, wherein at least some of the plurality of BFD processes are different from each other;
wherein the monitoring configuration parameter comprises at least one of the following information:
a set of reference state configuration parameters configured for each reference signal (RS) of the terminal;
a set of reference state configuration parameters configured for each RS set of the terminal;
a set of reference state configuration parameters configured for each bandwidth part BWP) of the terminal;
a set of reference state configuration parameters configured for the cell of the terminal;

a set of reference state configuration parameters configured for each carrier of the terminal; or
a set of reference state configuration parameters configured for each bandwidth or at least one bandwidth combination of the terminal.

17. The detection configuration method for network communication according to claim 16, wherein the at least one BWP comprises at least one activated BWP and/or at least one configured BWP, and the at least one cell comprises at least one serving cell and/or at least one configured cell.

18. A terminal, comprising a memory, a processor, and a computer program that is stored in the memory and capable of running on the processor, wherein when the computer program is executed by the processor, steps of a state detection method for network communication are implemented, the method comprises:
obtaining a monitoring configuration parameter of a reference state, wherein the monitoring configuration parameter comprises at least one set of reference state configuration parameters; and
performing, based on the monitoring configuration parameter, a detection process corresponding to the reference state, wherein
the performing, based on the monitoring configuration parameter, the detection process corresponding to the reference state, comprises:
performing the detection process to a plurality of RLM processes and/or a plurality of BFD processes based on the monitoring configuration parameter, wherein each of the plurality of RLM processes or BFD processes corresponds to one set of reference state configuration parameters, wherein at least some of the plurality of RLM processes are different from each other, wherein at least some of the plurality of BFD processes are different from each other;
the reference state comprises radio link monitor (RLM) and/or beam failure detection (BFD);
wherein the monitoring configuration parameter comprises at least one of the following information:
a set of reference state configuration parameters configured for each reference signal (RS) of the terminal;
a set of reference state configuration parameters configured for each RS set of the terminal;
a set of reference state configuration parameters configured for each bandwidth part (BWP) of the terminal;
a set of reference state configuration parameters configured for the cell of the terminal;
a set of reference state configuration parameters configured for each carrier of the terminal; or
a set of reference state configuration parameters configured for each bandwidth or at least one bandwidth combination of the terminal.

* * * * *